Dec. 9, 1958 R. K. POTTER 2,863,712

ELECTRIC PRINTER FOR MAGNETIC CODES

Filed Dec. 29, 1955

INVENTOR
R. K. POTTER
BY
Harry C. Hart
ATTORNEY

United States Patent Office 2,863,712

Patented Dec. 9, 1958

2,863,712

ELECTRIC PRINTER FOR MAGNETIC CODES

Ralph K. Potter, Brookside, N. J., assignor to Bell Telephone Laboratories, Incorporated, New York, N. Y., a corporation of New York Application December 29, 1955, Serial No. 556,199

7 Claims. (Cl. 346—74)

This invention relates to a method of and means for magnetic printing of discrete bits of information.

Conventional magnetic recording heads have been employed familiarly for recording continuous information in the nature of an audible sound. In order to provide the desired quality of tonal reproduction and to insure adequate strength to the magnetically recorded signal, it has been common in the art to employ a high permeability magnetic core structure having an air gap and being wound about with magnetizing coils. The flux passing through this air gap then serves to polarize magnetic particles of a magnetic recording medium in conformance with signal current flowing through the magnetizing coils. The finite dimensions of such an air gap, however, have led to some lack of definition in the resulting magnetic pattern and the recording head itself is open to the objection that it is weighty and expensive in manufacture.

A growing requirement for the transmission of coded bits of information arising out of the increased employment of digital computers, there has developed a need for a magnetic recording head peculiarly adapted to the recording of discrete rather than continuous signals, a recording head which preferably might discard the complex, bulky ferromagnetic structure of the prior art.

It is a principal object of the invention, then, to provide a magnetic recording head of simple structure and yet one adapted to record discrete bits of information with a high degree of definition. This object is achieved with the recognition that a magnetic recording medium may itself serve as a conductor of electrical signal current; that pulses of current flowing in such a medium are capable of establishing discrete magnetic field patterns; and that the intimacy of association of such a current with magnetic particles to be polarized contributes toward a high definition in the discrete patterns so established.

Figure 1:
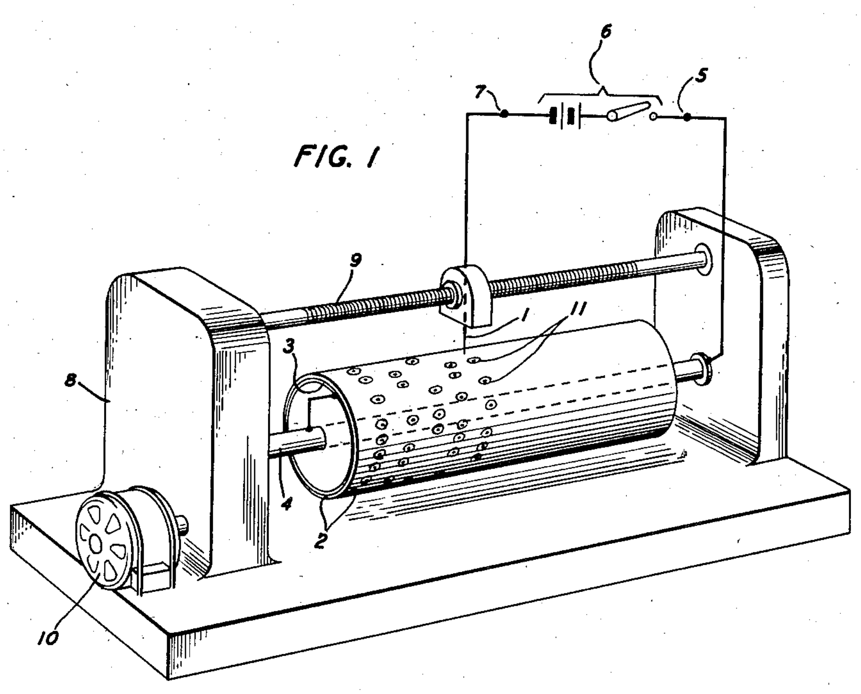
Figure 2:
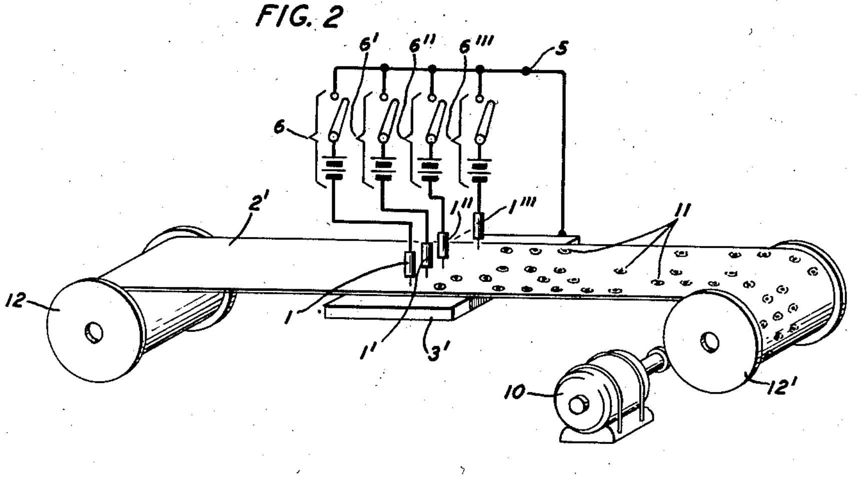

These and other features of the invention will be more fully apprehended from a consideration of the drawings in which:

Fig. 1 is a perspective view of an illustrative embodiment of the invention for imprinting discrete magnetic signals on a drum; and Fig. 2 shows an alternative embodiment of the invention for the magnetic printing by coded groups of discrete electrical signals.

Referring now to the drawings:

Fig. 1 shows an electrically conducting stylus 1 having an end juxtaposed with a cylindrical magnetic recording medium 2. This medium 2, in addition to being magnetizable, is also conductive, being, for example a steel sheet. Supporting the medium 2 is a backing electrode 3 connected through a shaft 4 to one terminal 5 of a selectively operable electrical pulse source 6. Under actuation of a motor 10 and suitable drive mechanisms 8, the cylindrical magnetic recording medium 2 is rotated while, at the same time, by the operation of the lead screw 9, the stylus 1 is moved along that recording medium 2 in a direction parallel to its axis of rotation as represented by the shaft 4. Completing an electrical circuit, the stylus 1 is connected to a second terminal 7 of the selectively operable pulse signal source 6.

Now movement of the stylus 1 with respect to the recording medium 2 establishes a space-time relationship on that medium. Within this space-time relationship, electrical signals originating from the source 6 pass to the stylus 1 through the magnetic recording medium 2 to the backing electrode 3. This passage of a current is accompanied by a magnetic field. The polarization of magnetic dipoles within the medium 2 by that field establishes a helical succession of discrete magnetic field patterns 11 as a record of the passage of the electrical signal currents.

Thus, in accordance with one feature of the invention, an ultimately simple magnetic recording head in the form of a single conducting stylus operates, under the influence of a pulsed electrical signal source, to establish in a magnetic recording medium a magnetic space pattern representative of discrete bits of information.

Fig. 2 shows a magnetic tape 2′ wound on the drums 12 and 12′ and passing over a backing planar electrode 3′. As in the previously discussed embodiment, the magnetic recording tape 2′ is a conductive one, for example, a steel tape. Arranged in a plane perpendicular to the direction of tape movement is a plurality of styli, 1, 1′, 1″ . . . each connected to an individual one of a plurality of separately operable pulse signal sources 6, 6′, 6″ . . . These signal sources 6, 6′, 6″ . . . have a common terminal 5 connected to the backing electrode 3′ in a fashion similar to that discussed in consideration of Fig. 1. Signals originating in the respective sources 6, 6′, 6″ . . . cause pulse currents to flow from the individual styli 1, 1′, 1″ . . . through the recording tape 2′. A time-space relational significance is imparted to the magnetic tape 2′ by the rotation of the drum 12′ under the influence of the drive motor 10.

Now by practice of the invention as illustrated in the embodiment of Fig. 1, it has been seen, a time-coded sequence of electrical signals is recorded as a space pattern of discrete magnetic fields disposed along a helical recording axis. Looking, however, to the embodiment of Fig. 2, it appears that groups of time-coded electrical signals are recorded as individually space-coded magnetic field patterns disposed, in accordance with the positioning of the styli, along a first axis and, as space-coded groups of patterns, along a second axis in accordance with the time-coding of the electrical signals. Such biaxial coding imparts information handling flexibility to this embodiment of the invention in permitting a multpilication of the significances which may be space-coded along the two axes.

These embodiments are in no wise to be considered as limiting the scope of the invention nor the breadth of the claims which define it. Rather these embodiments are illustrative only of principal features of the invention and indicative, too, of the extent of its application.

Reference is hereby made to a related application of R. K. Potter, Serial No. 561,887, filed January 27, 1956.

What is claimed is:

1. In apparatus for magnetic recording, the combination which comprises an electrically conductive stylus, a conductive sheet of magnetic recording material having a surface conductively juxtaposed with one end of said stylus at a first point, an electrode conductively juxtaposed with a surface of said sheet at a second point, said first and second points being spaced apart, and a signal-operated source of pulsed current, connected in series with said electrode and said stylus to pass magnetizing signal currents through said sheet, thereby to imprint a magnetic pattern on said sheet.

2. Apparatus as set forth in claim 1 and, in combination therewith, means adapted to present a different area of said sheet to said stylus for each successive operation of said source.

3. Apparatus as set forth in claim 1 wherein said electrode and said end of said stylus are in juxtaposition with opposite surfaces of said sheet.

4. In apparatus for magnetic recording, the combination which comprises an electrically conductive stylus, a conductive sheet of magnetizable material having a surface in conductive juxtaposition with one end of said stylus at a first point, an electrode in conductive juxtaposition with said conductive sheet at a second point, said first and second points being spaced apart, a signal-operated source of pulsed currents connected in series with said stylus and said electrode to pass magnetizing signal currents through said sheet, and means for moving said stylus with respect to said surface to direct said signal currents through zones of said sheet to said electrode in accordance with operating signals and with movements of said sheet, thereby to imprint a magnetic pattern on said zones.

5. Apparatus as set forth in claim 4 wherein said electrode and said stylus are in conductive juxtaposition with opposite surfaces of said sheet.

6. In apparatus for magnetic recording, the combination which comprises a conductive sheet of magnetizable material, an electrode in contact with a surface of said sheet at a contact point, a first plurality of electrically conductive styli, said styli being disposed to have respectively one end in juxtaposition with a surface of said sheet at a like plurality of marking points, said marking points and said contact point being mutually separated in space, a like plurality of selectively operable sources of electrical current pulses connected respectively in series with said styli and, in common, with said electrode to cause selective current flow from said styli respectively through said sheet to said electrode, thereby to imprint a magnetic pattern on said sheet, and means for presenting a different area of said sheet to said styli for successive operations of said source.

7. Apparatus for forming a space pattern record of the signal from a source which comprises a sheet of material that is electrically conductive, magnetically sensitive and magnetically retentive, a conductive stylus in contact with one portion of said sheet, an electrode in contact with another portion of said sheet, said portions being spaced apart, and means for generating a current flow from said source through said sheet between said stylus and said electrode, thereby to establish a magnetic flux lying in the plane of said sheet.

References Cited in the file of this patent

UNITED STATES PATENTS

| | | |
|---|---|---|
| 2,035,475 | Hay | Mar. 31, 1936 |
| 2,425,003 | Potter | Aug. 5, 1947 |
| 2,436,829 | Roth | Mar. 2, 1948 |
| 2,700,148 | McGuigan | Jan. 18, 1955 |